UNITED STATES PATENT OFFICE.

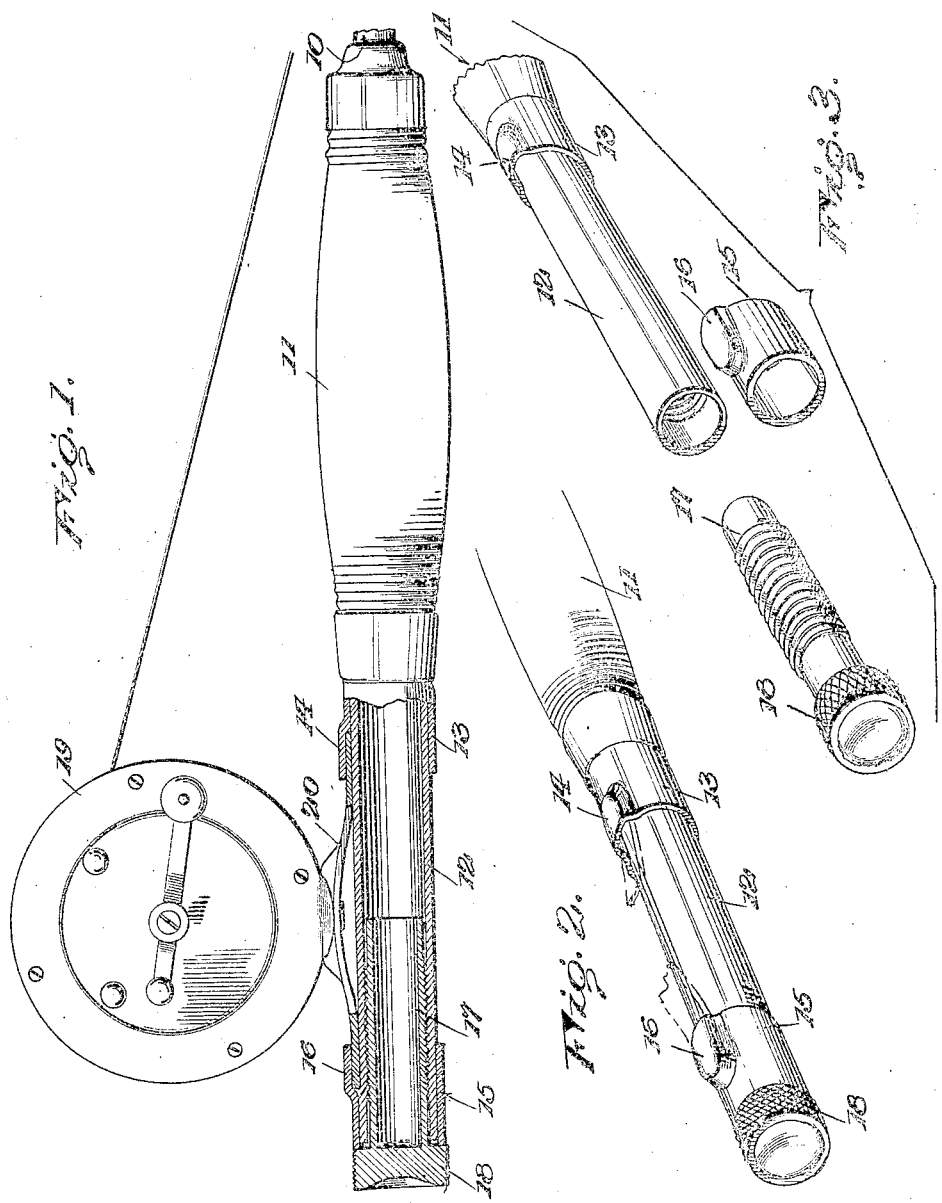

WILBUR L. BEATY, OF SOUTH BUTTE, MONTANA.

REEL-SEAT FOR FISHING-RODS.

1,350,636.  Specification of Letters Patent.  Patented Aug. 24, 1920.

Application filed November 26, 1919. Serial No. 340,785.

*To all whom it may concern:*

Be it known that I, WILBUR L. BEATY, citizen of the United States, residing at South Butte, in the county of Silver Bow and State of Montana, have invented certain new and useful Improvements in Reel-Seats for Fishing-Rods, of which the following is a specification.

This invention relates to an improved reel seat for fishing rods and has as one of its principal objects to provide a reel seat wherein a reel may be quickly and securely clamped thereon.

The invention has as a further object to provide a reel seat employing a slidable reel base engaging sleeve and wherein adjustable means will be provided for advancing said sleeve and securely holding the sleeve against accidental disengagement from the reel base.

And the invention has as a still further object to provide a reel seat which will be characterized by structural simplicity and which may be readily employed in connection with substantially any conventional type of fishing rod.

Other and incidental objects will appear hereinafter.

In the drawings:

Figure 1 is a side elevation partly broken away and shown in section, this view illustrating my improved reel seat embodied in the handle of a fishing rod of conventional type, an ordinary reel being shown in position upon the seat, Fig. 2 is a fragmentary perspective view of the reel seat showing the parts assembled, and Fig. 3 is a similar view showing the parts disassembled.

Referring more particularly to the drawings, I have shown my improved reel seat embodied in the handle of a fishing rod 10 of conventional type. The handle is indicated at 11. In carrying the invention into effect, I employ a barrel 12 which may be fitted over the rear end portion of the handle or otherwise secured thereto. This barrel may be formed of metal or other approved material and fixed upon the barrel at its inner end is a sleeve 13 provided at the upper side of the barrel with a socket 14. Slidable upon the outer end portion of the barrel is a sleeve 15 also provided with a socket 16 corresponding to the socket 14 of the fixed sleeve. Adjustable within the barrel is a follower 17 for the sleeve 15. This follower may, as illustrated in the drawings, be formed with a hollow shank and said shank is externally threaded to coact with internal threads upon the barrel. At the outer end of the shank of the follower is a head 18 which is preferably milled so that the follower may be readily turned.

In Fig. 1 of the drawings, I have shown a conventional reel 19 in position upon my improved reel seat, this reel being provided with the usual reel base 20. In connecting the reel with the reel seat, one end of the base 20 thereof is first engaged within the socket 14 of the sleeve 13 when the sleeve 15 may then be manually shifted to initially engage the socket 16 over the opposite end portion of the reel base. Then, by properly turning the head 18 of the follower, the follower may be adjusted for advancing the sleeve 15 and thus tightly binding the reel upon the seat. As will be clear, the follower will tightly hold the sleeve 15 against retraction, so that at all times, the reel will be firmly clamped upon the seat while possibility of accidental displacement of the reel will be effectually avoided. It will accordingly be seen that I provide a highly efficient type of reel seat and a reel seat which may be readily employed in connection with substantially any conventional type of fishing rod.

Having thus described the invention, what is claimed as new is:

1. A reel seat including a barrel, fixed reel engaging means thereon, a sleeve slidable upon the barrel to coact with said means for connecting a reel with the barrel, the barrel having its wall internally threaded, and a follower threaded to engage the threads of the barrel and adjustable to coact with said sleeve for advancing the sleeve.

2. A reel seat including a barrel, fixed reel engaging means thereon, a sleeve slidable upon the barrel to coact with said means for connecting a reel with the barrel, the barrel having its wall internally threaded, and a follower threaded to engage the threads of the barrel and adjustable to coact with said sleeve for advancing the sleeve, the sleeve being loose with respect to the follower whereby said sleeve may be advanced or retracted independently of the follower.

In testimony whereof I affix my signature.

WILBUR L. BEATY.  [L. S.]